July 23, 1957  J. C. JANSEN  2,799,897
METHOD FOR PRODUCING SEAMLESS FILLED CAPSULES
Filed May 22, 1953
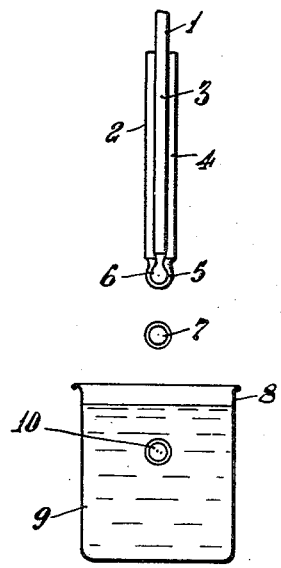
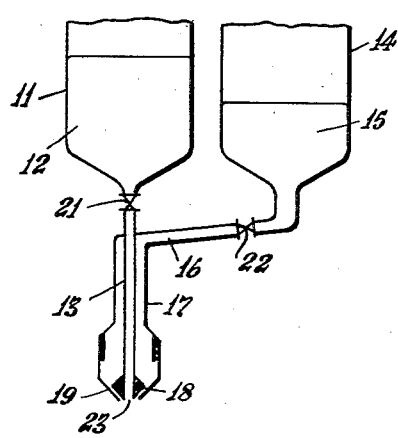
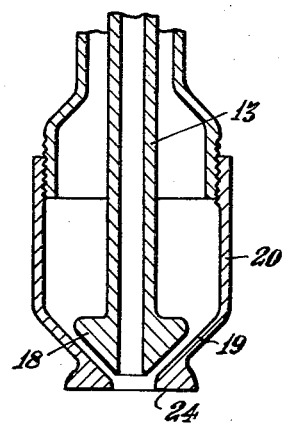
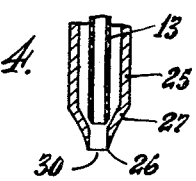
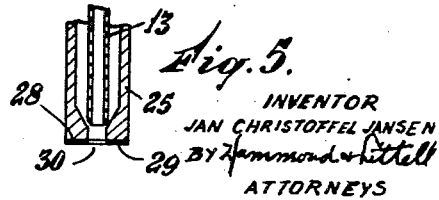
INVENTOR
JAN CHRISTOFFEL JANSEN
BY Hammond & Littell
ATTORNEYS

United States Patent Office 2,799,897
Patented July 23, 1957

2,799,897

METHOD FOR PRODUCING SEAMLESS FILLED CAPSULES

Jan Christoffel Jansen, Nieuw-Loosdrecht, Loosdrecht, Netherlands, assignor to Trifax N. V., Chemisch-Pharmaceutische en Extractiebedrijven, Amsterdam, Netherlands, a corporation of the Netherlands Application May 22, 1953, Serial No. 356,831

Claims priority, application Netherlands May 26, 1952

5 Claims. (Cl. 18—55)

This invention relates to the production of seamless filled capsules. Prior attempts to produce seamless filled capsules containing ingredients in a fluid or semi-fluid state in a shell of congealable encapsulating material have resulted in the production of capsules which are not uniform spheres, and which must be subsequently heat treated to produce uniform smooth spheres. For example, in U. S. Patent No. 2,275,154 to E. C. Merrill et al., a process for producing such seamless filled capsules is shown and described, which results in the initial production of a capsule having a tail or projection at the point at which the capsule drops from the encapsulating apparatus and in which such tailed capsules undergo a special treatment in a liquid bath to enable the encapsulating material to soften and assume a spherical shape.

Such process and the apparatus for practicing it are unnecessarily complicated and require careful manipulation to provide smooth spherical capsules. The apparatus and process of the said Merrill et al. patent operate preferably at a pressure of the order of 40 pounds per sq. in. and make use of a high viscosity gelatin composition. Encapsulating or coating material of gelatin or other composition of this high viscosity will not flow with sufficient speed to assume a spherical shape within the period in which it drops from the nozzle of the encapsulating machine into the cooling liquid, hence the necessity of an after treatment.

I have found that by using a gelatin or other encapsulating composition of sufficiently low viscosity at the temperature of operation it is possible to produce in continuous operation filled capsules of gelatin or other encapsulating material which will assume a true spherical shape during the time interval lying between their dropping from the nozzle of the encapsulating machine and their solidification.

One of the objects of my invention is therefore to produce in continuous operation filled capsules of gelatin or other encapsulating material which are easy to produce and which can be formed in true spherical shape without the necessity of an after treatment such as heating.

Another object of my invention is to produce in continuous operation big size filled capsules of gelatin or other encapsulating material which are easy to produce, and which can be formed in true spherical shape by supporting the capsules in the process of formation on the cooling liquid without the necessity for an after treatment such as heating.

Yet another object of my invention is to produce in continuous operation filled capsules of true spherical shape having a substantially uniform thickness of encapsulating material around the filler.

Various other objects and advantages of my invention will become apparent as this description proceeds.

In the said Merrill et al. patent a gelatin mixture having a viscosity largely in excess of 2500 centipoises at the working temperature of approximately 40–60° C. is used under a working pressure of approximately 40 pounds per sq. in. An encapsulating material of gelatin or other encapsulating composition of such high viscosity cannot readily assume a true spherical shape on dropping from the nozzle of the encapsulating machine and even though the capsules are subsequently treated in a liquid bath to permit the assumption of a somewhat spherical shape the capsules are not of uniform wall thickness and have either surface irregularities or wall thickness irregularities which are undesirable.

In the process and apparatus of my invention I use a gelatin or other encapsulating composition which has a viscosity preferably not in excess of 1500 centipoises at the working temperature and which can be supplied in a fluid state to the nozzle of the encapsulating machine and emerge therefrom substantially by gravity or at a pressure of a few ounces, which may readily be created by the hydrostatic head of the liquid gelatin or other encapsulating composition above the nozzle or otherwise.

In this way the gelatin or other encapsulating material and the filling material may, in substance, be caused to drop from the nozzle of the encapsulating machine and assume a true spherical shape almost the instant the composite drop has severed itself from the nozzle.

To control the size of the capsules the viscosity of the encapsulating material may be varied within limits.

According to the present invention it is also possible, by supporting the capsules as they emerge from the tip of the encapsulating nozzles on a liquid bath of sufficient density, to produce capsules of enlarged diameter with continuous rather than intermittent flow of the gelatin or other encapsulating material and filler from the nozzle. The nozzle may be spaced from the cooling liquid a sufficient distance to permit enlargement of the capsules to the desired size to be formed on the surface of the cooling liquid, or with a cooling liquid of proper density the nozzles may be located near to or below the surface of the cooling liquid so that the cooling liquid gives support to the capsule being formed to enable the size of the capsule to be controlled.

As is well understood in the art, the capsules may contain any liquid filler provided it does not attack or solubilize the encapsulating material to any material extent. By "liquid filler" will be understood any filling ingredient of liquid or pastry nature or a suspension, said ingredient being either liquid at ordinary temperature or sufficiently liquefied at the working temperature to become free flowing.

Compositions such as will be described in the examples hereinafter may be used for the production of filled capsules at substantially atmospheric pressure, using only a sufficient hydrostatic liquid pressure head to cause the material to flow or drop from the end of the encapsulating nozzles. If desired, a slight superatmospheric pressure may be used on the encapsulating composition, on the filling composition, or on both, but a substantial pressure should be avoided because, if the encapsulating composition is of sufficiently high viscosity that it will not flow through the nozzles of the encapsulating machine under a low pressure, it will not form capsules of substantially constant weight of the filler per capsule. Neither will it form into true spherical capsules and will result in the production of capsules with substantial tails at the point of separation from the encapsulating nozzles, producing capsules of non-uniform shape and irregular wall thickness.

In the embodiment of the invention diagrammatically illustrated in the drawings, Fig. 1 shows in diagram the approximate relationship between the parts of the apparatus, Fig. 2 indicates in diagram the relationship of the nozzle and the encapsulating material and filler containers, Fig. 3 shows a detail of the adjustable nozzle preferably used, Fig. 4 shows a further detail of the encapsulating nozzle and Fig. 5 shows a modification of nozzle construction.

In an apparatus of this type a hydrostatic head of liquid of a few centimeters is sufficient to permit regulater flow of the capsule composition and the filler to cause filled capsules of the desired size to drop from the encapsulating nozzles.

Referring now to the details of the drawing, reference numeral 1 shows a duct for supplying in a continuous flow the filler material to the encapsulating nozzle.

Reference numeral 2 shows a duct for supplying in a continuous flow the encapsulating composition to said nozzle. Reference numerals 5 and 6 indicate a capsule in the process of formation, whereas the numeral 7 shows a capsule already separated from the nozzle in the process of falling into the cooling liquid 9. Capsule 10 is shown while slowly sinking through said liquid to the bottom of the receptacle 8. The cooling liquid must have a composition not attacking or dissolving the encapsulating material to any material extent. It will have a density slightly less than the average density of the capsules so that the capsules will sink slowly to the bottom of the receptacle and a sufficiently low temperature to effect the congealing of capsule walls in the process of sinking. In some cases it is of advantage to bring the cooling liquid in motion so as to impart to the capsules therein a transverse motion in order to avoid their coming into contact with each other.

Fig. 2 shows diagrammatically the relationship of the encapsulating nozzle, the feeding ducts and the encapsulating material and filler containers. The filler ingredients 12 are located in the container 11 which is connected by means of the duct 13 with the encapsulating nozzle. The encapsulating composition 15 is located in the container 14 and flows from said container through the duct 16 to the encapsulating nozzle. Both the filler ingredients and the encapsulating composition are fed to the nozzle in a continuous flow by their respective hydrostatic heads which are of the order of a few inches, and their respective containers are provided with means (not shown in the drawing) to maintain constant levels therein.

The flow velocity of the filler material is controlled by a valve 21. This valve may be supplemented with or be replaced by a capillary of adequate length and bore. The flow velocity of the encapsulating composition is controlled by a valve 22 and by the nozzle as will be explained hereinafter. Heating means (not shown in the drawing) maintain the encapsulating composition at the desired temperature. If necessary, heating means may be equally provided to heat the filler material. This will generally be the case if said material is of viscous or pasty nature at ordinary temperatures. In order to measure out accurately the quantity of the encapsulating composition, the encapsulating nozzle is provided, according to the invention, with a conical part 18 at the end of the filler feeding duct 13, and with a corresponding conical constriction 19 at the end part 20 of the encapsulating composition feeding duct. This end part 20 is screwably mounted on said duct so that by screwing it in or out it is possible to adjust the clearance between the cone and the constriction, regulating thereby the flow of the encapsulating composition within very narrow limits.

Another advantage of this conical constriction is that the encapsulating composition is brought right under or at least into the immediate vicinity of the filler as it emerges from duct 13, allowing thereby to the production, if desired, of very small capsules. Obviously the diameter of the constriction, orifice, the viscosity of the encapsulating composition, and the feeding rate of said composition and of the filler, must be adapted to the desired size of the capsules. In order to produce very small capsules it is moreover desirable to provide the orifice of the nozzle constriction externally with a sharp edge and to recess the external surface of said constriction with respect to said edge. Alternatively it is possible to make the external surface of the constriction repellent to the encapsulating composition, e. g. by providing it with a thin layer of a repellent composition, to avoid the adherence of said encapsulating composition to said surface.

The lower face of the nozzle may be provided with a horizontal annular surface 24 contiguous to the nozzle orifice in order to allow the production of big capsules, if desired. Figure 4 shows the end of the encapsulating nozzle 25 provided with a sharp edge 26 and a recessed external surface 27 and Figure 5 shows the encapsulating nozzle 25 as being provided with a flat end 28 which is covered or coated with a layer 29 of a composition which is repellent to the encapsuling composition. The opening in the nozzle 25 is indicated by the numeral 30.

As has been already set out above, it is of advantage when producing big size capsules to allow the capsules to be supported by the cooling liquid in the process of formation.

The following examples will serve to disclose the invention in a more explicit way.

*Example I*

Encapsulating composition: 36% gelatin, 12% glycerin, 52% water. This composition had at the working temperature of 48° C. a viscosity of 595 centipoises and a density of 1.11. The hydrostatic head, i. e. the vertical distance between the level of said composition in the container and the nozzle aperture, was maintained at 120 mm. The filler consisted of a solution of vitamins in oil, and had a density of 0.92. The filler was fed to the nozzle at a temperature of 20° C., and under a hydrostatic head of 600 mm. To achieve the desired rate of the filler flow, a capillary of 98 mm. length and a clearance of 1 mm. was inserted in the duct. The bore of cone 18 was 1 mm. in diameter, the bore of the constriction was 3.25 mm., the clearance between the cone and the constriction amounted to 0.42 mm. The fresh capsules had a total weight of approximately 75 mg. and a filler weight of 37.5±1.5 mg., the rate of capsule production was 95 per minute. The capsules were allowed to fall into oil of 5° C., the level of which was located at about 8 cm. below the aperture of the nozzle. After traversing an oil layer of 60 cm. the capsule walls were solidified and collected at the bottom of oil receptacle, having a practically perfect spherical shape, and being of practically identical size.

*Example II*

In this example the same apparatus and the same encapsulating and filler compositions were used, but the encapsulating composition was heated to 72° C. and had a viscosity of 288 centipoises. The hydrostatic head of the encapsulating composition was 100 mm., and of the filler composition 600 mm. The capillary to regulate the flow of the filler had a length of 100 mm. and a bore of 0.7 mm. The temperature of the cooling oil was −5° C. and its level was located 6 cm. below the nozzle orifice. The fresh capsules had a total weight of 40.5±1.5 mg. and a filler weight of 12.5±1 mg. The rate of production was 102 capsules per minute.

*Example III*

Encapsulating composition: 42.9% gelatin, 14.3% glycerin, and 42.9% water. This composition had at the working temperature of 60° C. a viscosity of 1080 centipoises and a density of 1.14. It was fed to the nozzle under a hydrostatic head of 140 mm. The filler consisted of a solution of vitamins A and D in peanut oil having at its working temperature of 18° C. a density of 0.916. It was fed to the encapsulating nozzle under a hydrostatic head of 600 mm., its flow was controlled by means of a capillary of 192 mm. length and 2 mm. bore. The bore of the cone was 1.5 mm., the bore of the constriction was 3 mm. and the clearance between the cone and the constriction was 0.54 mm. The cooling medium was paraffin oil at 0° C. and a density of 0.875. Its level contacted the lower surface of the nozzle so as to support the capsules while they were being formed. The capsule walls were solidified after having traversed an oil layer of 70 cm. The rate of production under these circumstances was 50 capsules per minute, the approximate total weight of fresh capsules was 365 mg., and the filler weight was 200±5 mg. per capsule. The capsules were nearly perfect spheres and the wall thickness irregularities were sufficiently small to ensure the good keeping qualities of the capsules.

*Example IV*

Encapsulating composition: as in Example III. Working temperature of this composition 50° C. Viscosity at this temperature 1460 centipoises, density at this temperature 1.14. Filler composition: oily garlic extract, working temperature of the filler 18° C., density at this temperature 0.918. Hydrostatic head of the encapsulating composition was 160 mm.; hydrostatic head of the filler was 600 mm.; flow of the filler was controlled by means of a capillary of 110 mm. length and 2 mm. bore. The bore of the cone was 1.5 mm., the bore of the constriction 3 mm., clearance between cone and constriction 0.94 mm. Cooling medium: paraffin oil of −10° C., having a density at this temperature of 0.881. Cooling medium contacted lower face of the nozzle. Rate of production: 48 capsules per minute, approximate total weight of fresh capsule 800 mg., weight of the filler per capsule 450±15 mg.

*Example V*

Composition, working temperature, viscosity and density of the encapsulating material as in Example IV. Filler: bath perfume mainly consisting of oleum pini silvestris; working temperature of the filler 20° C., its density at this temperature 0.870. The height of the column of the encapsulating composition above the nozzle orifice was 320 mm.; for the filler it was 600 mm.; flow control of the filler by means of a capillary of 50 mm. length and 1 mm. bore. Cooling medium: peanut oil of 10° C., having at this temperature a density of 0.922. Diameter of the cone bore 1.5 mm., diameter of the constriction bore 3 mm., clearance between cone and constriction 1.08 mm. Lower face of the nozzle was located 10 mm. below the level of the cooling medium. Rate of production: 40 capsules per minute, total weight of fresh capsule: approximately 1700 mg., weight of the filler per capsule: 1000±40 mg.

Although in the above examples the encapsulating materials were gelatin compositions, other thermoplastic encapsulating materials, such as cellulose esters of organic acids, polyvinyl alcohol, polyesters, copolymers of vinylchloride with other vinylhalogen compounds, rubber hydrochloride etc. may be used to advantage for many applications.

I claim:

1. The method of forming seamless capsules composed of a congealed plastic capsule shell of substantially uniform thickness and spherical shape and a filler material encased by said capsule shell, which comprises heating a liquefiable but normally solid capsule shell-forming material to a temperature at which said capsule shell-forming material has a viscosity between about 300 and about 1500 centipoises, extruding the heated capsule shell-forming material under a hydrostatic head between 50 and 500 mm. through a capsule-forming orifice into a gaseous cooling medium to form a semi-congealed, droplet-shaped capsule shell, said cooling medium being at a temperature at which the heated capsule shell-forming material gradually congeals, while simultaneously introducing liquid filler material into said capsule shell until the semi-congealed capsule severs from the orifice to form a semi-congealed spherical filled capsule, and continuously and gradually cooling the semi-congealed capsule until the capsule shell has completely congealed into a spherically shaped capsule with a substantially uniform shell wall.

2. The method of forming seamless capsules composed of a congealed plastic capsule shell of substantially uniform thickness and spherical shape and a filler material encased by said capsule shell, which comprises heating a liquefiable but normally solid capsule shell-forming material to a temperature at which said capsule shell-forming material has a viscosity between about 300 and about 1500 centipoises, extruding the heated capsule shell-forming material under a hydrostatic head between 50 and 500 mm. through a capsule-forming orifice into air at substantially room temperature to form a semi-congealed, droplet-shaped capsule shell, while simultaneously introducing liquid filler material into said capsule shell until the semi-congealed capsule severs from the orifice to form a semi-congealed spherical capsule, dropping the capsule into a liquid cooling medium having a specific gravity less than the average specific gravity of the filled capsule and being at a temperature from about −10° C. to about +10° C., and continuously and gradually cooling the semi-congealed capsule until the capsule shell has completely congealed into a spherically shaped capsule with a substantially uniform shell wall.

3. The method of forming seamless capsules composed of a congealed plastic capsule shell of substantially uniform thickness and spherical shape and a filler material encased by said capsule shell, which comprises heating a liquefiable but normally solid capsule shell-forming material to a temperature at which said capsule shell-forming material has a viscosity between about 300 and about 1500 centipoises, extruding the heated capsule shell-forming material under a hydrostatic head between 50 and 500 mm. through a capsule-forming orifice into a single-phase liquid cooling medium at a temperature between about −10° C. and about +10° C. to form a semi-congealed droplet-shaped capsule shell, while simultaneously introducing liquid filler material into said capsule shell until the semi-congealed capsule severs from the orifice to form a semi-congealed spherical capsule, said liquid cooling medium having a specific gravity less than the average specific gravity of the filled capsule, and continuously and gradually cooling the semi-congealed capsule in said single-phase liquid cooling medium until the capsule shell has completely congealed into a spherically shaped capsule with a substantially uniform shell wall.

4. The method of forming seamless filled capsules according to claim 3, wherein the capsule-forming orifice is positioned with respect to the surface of the cooling medium so as to just touch the surface.

5. The method of forming seamless filled capsules according to claim 3, wherein the capsule-forming orifice is submerged in the cooling medium.

References Cited in the file of this patent
UNITED STATES PATENTS

| Number | Name | Date |
|---|---|---|
| 2,275,154 | Merrill et al. | Mar. 3, 1942 |
| 2,332,671 | Scherer | Oct. 26, 1943 |
| 2,379,817 | Mabbs | July 3, 1945 |
| 2,531,986 | Pile et al. | Nov. 28, 1950 |